(12) United States Patent
Son et al.

(10) Patent No.: US 9,684,829 B2
(45) Date of Patent: Jun. 20, 2017

(54) METHOD OF CAPTURING IRIS IMAGE, COMPUTER-READABLE RECORDING MEDIUM STORING THE METHOD, AND IRIS IMAGE CAPTURING APPARATUS

(71) Applicant: Samsung Electronics Co., Ltd., Gyeonggi-do (KR)

(72) Inventors: Byung-jun Son, Seoul (KR); Joo-young Son, Gyeonggi-do (KR); Tae-hwa Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 14/458,758

(22) Filed: Aug. 13, 2014

(65) Prior Publication Data

US 2015/0049179 A1 Feb. 19, 2015

(30) Foreign Application Priority Data

Aug. 13, 2013 (KR) .......................... 10-2013-0096190

(51) Int. Cl.
*G06K 9/00* (2006.01)
*H04N 5/232* (2006.01)

(52) U.S. Cl.
CPC ..... *G06K 9/00604* (2013.01); *G06K 9/00912* (2013.01); *H04N 5/23219* (2013.01); *H04N 5/23222* (2013.01)

(58) Field of Classification Search
CPC ........... G06K 9/00597; G06K 9/00604; G06K 9/0061; G06K 9/00912
USPC ....................................................... 382/117
See application file for complete search history.

(56) References Cited

U.S. PATENT DOCUMENTS

| | | | | |
|---|---|---|---|---|
| 6,289,113 B1* | 9/2001 | McHugh | ................ | G06K 9/228 351/218 |
| 6,714,665 B1* | 3/2004 | Hanna | ...................... | G06K 9/00 382/106 |
| 2002/0005893 A1* | 1/2002 | Horiguchi | .............. | A61B 3/145 348/137 |
| 2003/0152252 A1* | 8/2003 | Kondo | ............... | G07C 9/00158 382/117 |
| 2004/0252988 A1* | 12/2004 | Imaoka | .............. | G06K 9/00604 396/18 |
| 2008/0002863 A1 | 1/2008 | Northcott et al. | | |
| 2009/0208064 A1 | 8/2009 | Cambier | | |
| 2010/0110374 A1 | 5/2010 | Raguin et al. | | |

(Continued)

FOREIGN PATENT DOCUMENTS

| KR | 1020030077126 | 10/2003 |
|---|---|---|
| WO | WO 2010/056542 | 5/2010 |

OTHER PUBLICATIONS

International Search Report dated Nov. 12, 2014 issued in counterpart application No. PCT/KR2014/007208.

*Primary Examiner* — John Strege

(74) *Attorney, Agent, or Firm* — The Farrell Law Firm, P.C.

(57) ABSTRACT

Methods and apparatuses are provided for capturing an image in a portable terminal. An image is received at the portable terminal. An eye region is detected in the image. An eye center of the eye region is determined. It is determined whether a reflection region is detected in the eye region. When the reflection region is detected, a shape of the reflection region is determined, and guide information for preventing the reflection region is output based on the shape of the reflection region.

16 Claims, 10 Drawing Sheets

(56) References Cited

U.S. PATENT DOCUMENTS

| | | | |
|---|---|---|---|
| 2011/0013007 A1* | 1/2011 | Holmberg | A61B 3/113 348/78 |
| 2011/0249868 A1* | 10/2011 | Tsukizawa | A61B 3/113 382/103 |
| 2012/0162603 A1* | 6/2012 | Dejima | A61B 3/113 351/209 |
| 2013/0002846 A1* | 1/2013 | De Bruijn | A61B 3/113 348/78 |
| 2013/0088583 A1 | 4/2013 | Northcott et al. | |
| 2013/0162799 A1* | 6/2013 | Hanna | A61B 5/117 348/78 |
| 2013/0194408 A1* | 8/2013 | Hanna | G06K 9/00604 348/78 |
| 2013/0215275 A1* | 8/2013 | Berini | G06F 21/32 348/150 |
| 2014/0169642 A1* | 6/2014 | Law | G06K 9/00597 382/117 |
| 2015/0042776 A1* | 2/2015 | Davis | G06K 9/036 348/78 |

* cited by examiner

FIG. 5A
FIG. 5B
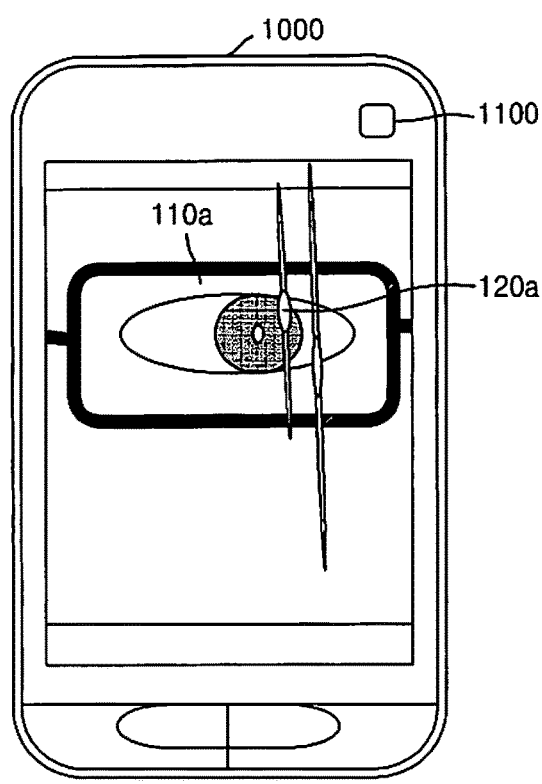
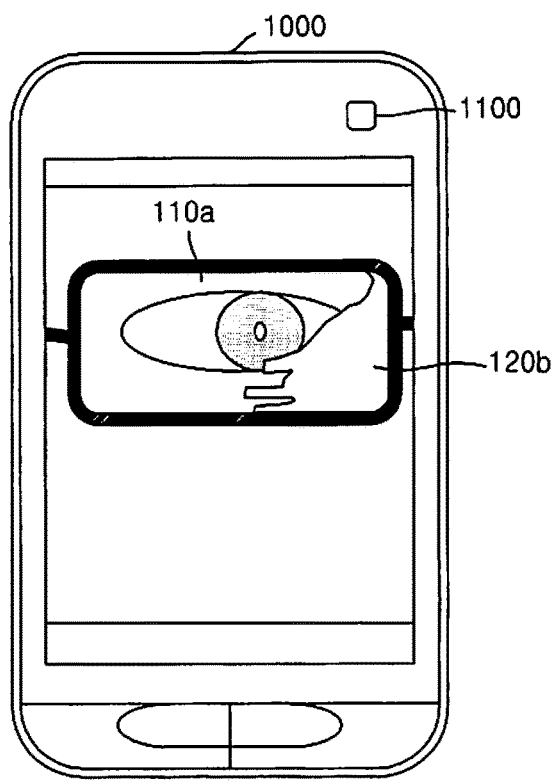

FIG. 7A
FIG. 7B
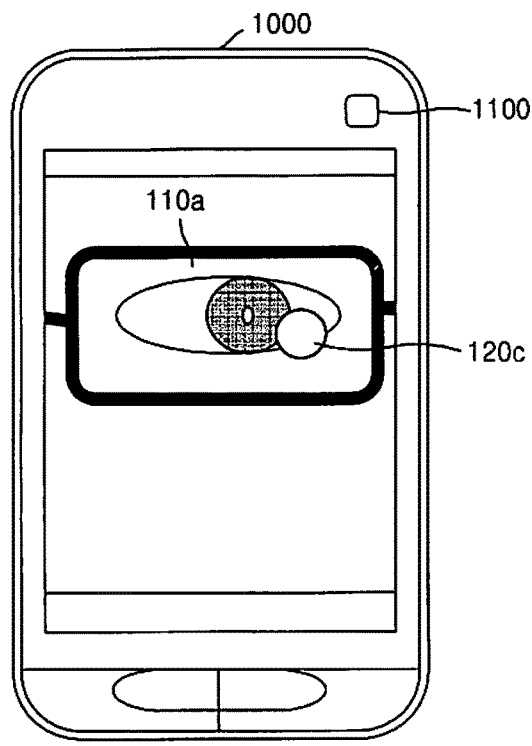
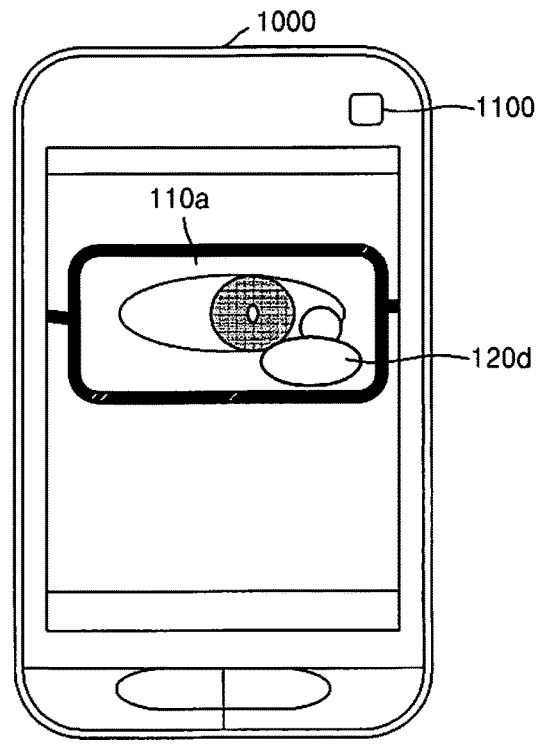

FIG. 8A
FIG. 8B
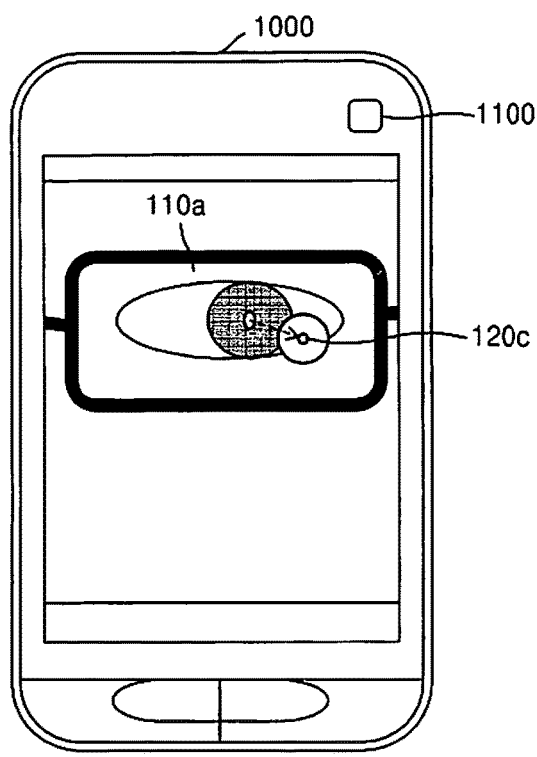
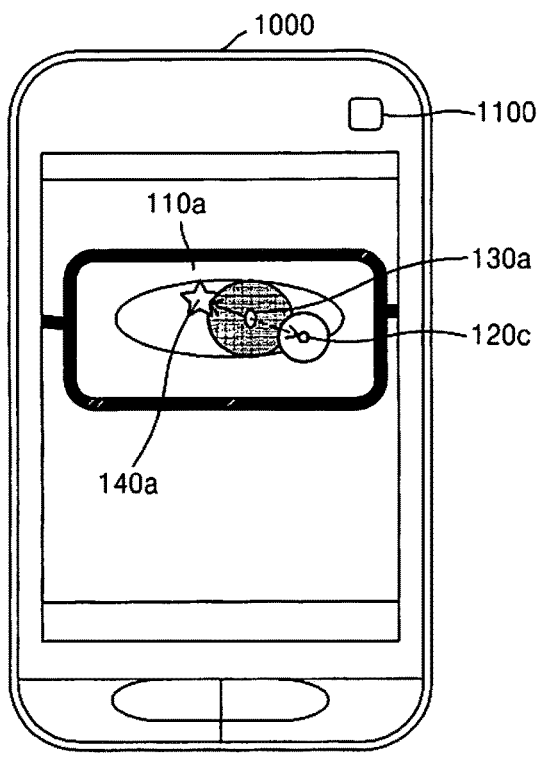

FIG. 9A
FIG. 9B
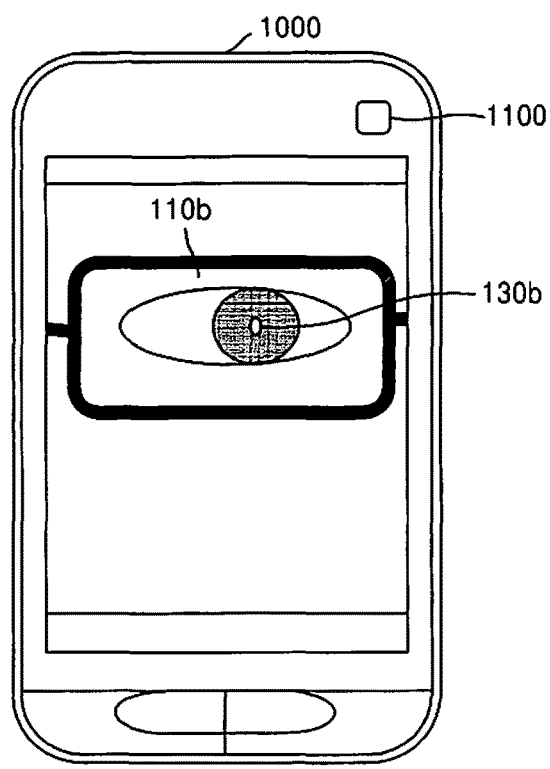
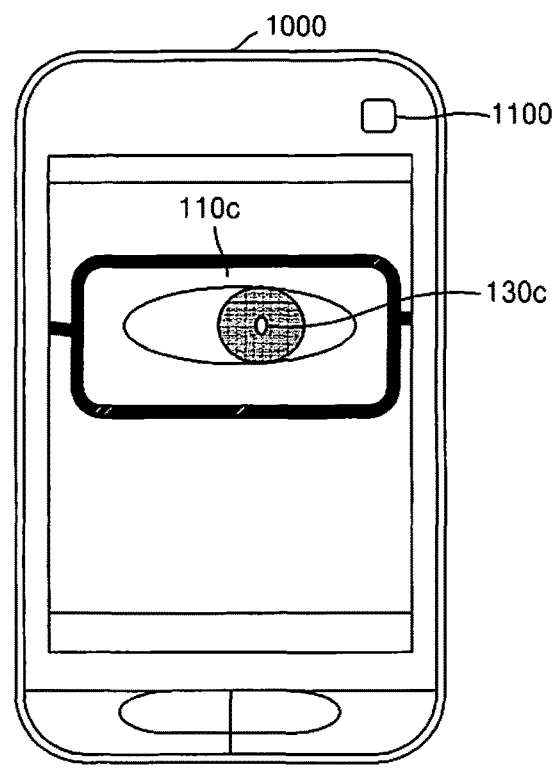

METHOD OF CAPTURING IRIS IMAGE, COMPUTER-READABLE RECORDING MEDIUM STORING THE METHOD, AND IRIS IMAGE CAPTURING APPARATUS

PRIORITY

This application claims priority under 35 U.S.C. §119(a) to Korean Patent Application No. 10-2013-0096190, filed on Aug. 13, 2013, in the Korean Intellectual Property Office, the content of which is incorporated herein by reference.

BACKGROUND OF THE INVENTION

1. Field of the Invention

The present invention relates generally to an image capturing apparatus, and more particularly, to a method of providing guide information for capturing an iris image, a computer-readable recording medium storing the method, and an iris image capturing apparatus.

2. Description of the Related Art

The importance of security of personal information stored in portable terminals has been emphasized, and there has been an increased need for authenticating users of portable terminals by biometric recognition.

In order to capture a high-quality image of an iris of a user, an iris recognizing apparatus uses a camera having an auto focus function and a zoom in/out function, and uses a high-spec camera capable of minimizing motion blurring.

However, a front camera of a thin apparatus, such as, for example, a smartphone, does not have an auto focus function and a zoom in/out function. Thus, when a portable terminal is configured to have an auto focus function and a zoom in/out function for iris recognition, the thickness of the portable terminal increases and the cost thereof increases.

SUMMARY OF THE INVENTION

The present invention has been made to address at least the above problems and/or disadvantages and to provide at least the advantages described below. Accordingly, an aspect of the present invention provides iris image capturing methods for capturing an image, in which reflected light is not present and eye movement is stabilized, from among images captured by a camera.

According to an aspect of the present invention, a method is provided for capturing an image in a portable terminal. An image is received at the portable terminal. An eye region is detected in the image. An eye center of the eye region is determined. It is determined whether a reflection region is detected in the eye region. When the reflection region is detected, a shape of the reflection region is determined, and guide information for preventing the reflection region is output based on the shape of the reflection region.

According to another aspect of the present invention, an image capturing apparatus is provided, which includes an image receiving unit configured to receive an image, an eye region detecting unit configured to detect an eye region in the image, and an eye center determining unit configured to determine an eye center of the eye region. The image capturing apparatus also includes a reflection region detecting unit configured to determine whether a reflection region is detected in the eye region, and a shape determining unit configured to determine a shape of the reflection region, when the reflection region is detected. The image capturing apparatus further includes a guide information output unit configured to output guide information for preventing the reflection region based on the shape of the reflection region, when the reflection region is detected.

According to an additional aspect of the present invention, a computer-readable recording medium is provided that stores computer program codes for performing a guide information providing method for an image capturing method when executed by a processor. In the image capturing method, an image is received. An eye region is detected in the image. An eye center of the eye region is determined. It is determined whether a reflection region is detected in the eye region. When the reflection region is detected, a shape of the reflection region is determined, and guide information for preventing the reflection region is output based on the shape of the reflection region.

BRIEF DESCRIPTION OF THE DRAWINGS

The above and other aspects, features, and advantages of the present invention will become more apparent from the following detailed description when taken in conjunction with the accompanying drawings in which:

FIGS. 5A and 5B illustrate an atypical reflection region determined by the iris image capturing apparatus, according to an embodiment of the present invention;

FIGS. 7A and 7B illustrate a typical reflection region determined by the iris image capturing apparatus, according to an embodiment of the present invention;

FIGS. 8A to 8C illustrate the outputting, by the iris image capturing apparatus, of guide information for preventing a reflection region based on a typical reflection region, according to an embodiment of the present invention; and FIGS. 9A and 9B illustrate the acquiring, by the iris image capturing apparatus, of eye movement information by detecting eye movement in an eye region, according to an embodiment of the present invention.

DETAILED DESCRIPTION OF EMBODIMENTS OF THE PRESENT INVENTION

Figure 1:
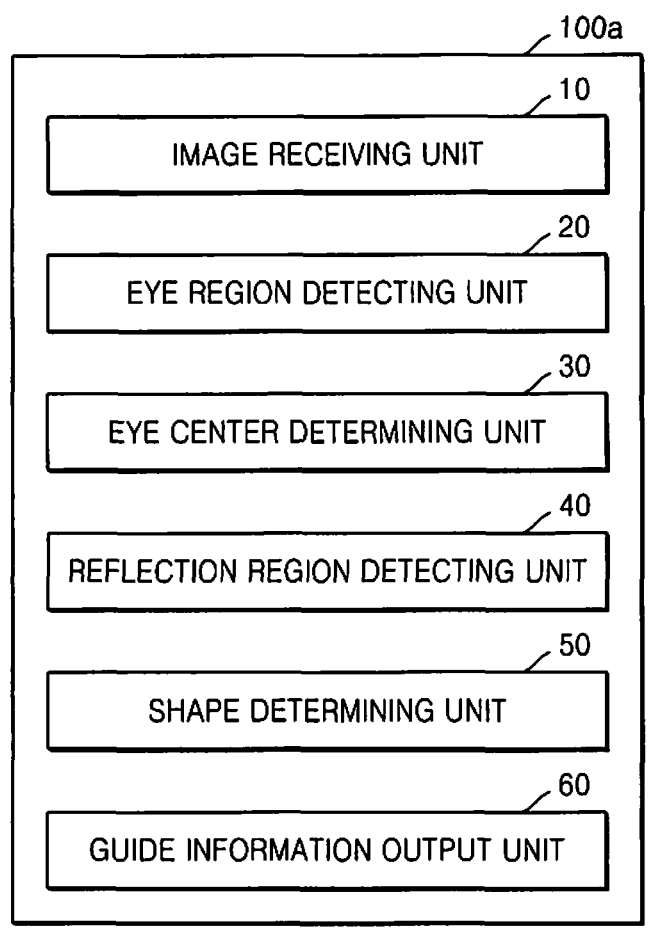
FIG. 1 is a block diagram illustrating an iris image capturing apparatus for providing guide information, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

As used herein, the term "and/or" includes any and all combinations of one or more of the associated listed items. Expressions such as "at least one of," when preceding a list of elements, modify the entire list of elements and do not modify the individual elements of the list.

Although terms such as "first" and "second" may be used herein to describe various elements or components, these elements or components should not be limited by these terms. These terms are only used to distinguish one element or component from another element or component.

The terms used herein are for the purpose of describing embodiments only and are not intended to limit the scope of the present invention. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram of an iris image capturing apparatus for providing guide information, according to an embodiment of the present invention.

Referring to FIG. 1, an iris image capturing apparatus 100a includes an image receiving unit 10, an eye region detecting unit 20, an eye center determining unit 30, a reflection region detecting unit 40, a shape determining unit 50, and a guide information output unit 60.

The image receiving unit 10 receives an image acquired from a camera. For example, the image may be an input image acquired from the camera.

The eye region detecting unit 20 detects an eye region in the image received by the image receiving unit 10.

For example, a method of detecting an eye region from an input image may include various methods such as, for example, a learning-based method and a mask-based method, but is not limited thereto.

The eye center determining unit 30 determines an eye center of the eye region detected by the eye region detecting unit 20.

For example, the eye center may be a center point of the eye region.

As another example, the eye center may be center coordinates of a region of the eye region that has a pixel gray scale value that is less than or equal to a predetermined threshold value. Also, when an iris region is detected in the eye region, the eye center may be an iris center. Also, the eye center may be a center of a pupil region.

According to an embodiment of the present invention, the reflection region detecting unit 40 detects a reflection region in the eye region detected by the eye region detecting unit 20.

The pixel gray scale value may be represented by numerical values 0 to 255 representative of pixel intensity.

For example, the reflection region may be a region of the eye region that has a pixel gray scale value that is greater than or equal to a predetermined threshold value.

The shape determining unit 50 determines a shape of the reflection region detected by the reflection region detecting unit 40.

For example, the reflection region may be a region of the eye region that has a pixel gray scale value that is greater than or equal to a threshold value. Thus, according to an embodiment of the present invention, a boundary line of adjacent pixels having a great change in the pixel gray scale value may be detected as the shape of the reflection region.

The shape of the reflection region may be determined by the form, size, position, and number of reflection regions. For example, the shape of the reflection region generated due to eyeglasses worn by a user may be an elliptical shape or a circular shape, as illustrated in FIGS. 7A and 7B. Also, the shape of the reflection region generated due to a contamination of a camera lens may be an atypical shape, as illustrated in FIGS. 5A and 5B.

The guide information output unit 60 outputs guide information for preventing the reflection region, based on the shape of the reflection region that is determined by the shape determining unit 50.

For example, when a reflection region is detected in the eye region, the iris image capturing apparatus 100a may output guide information for preventing the reflection region. When a reflection region is not detected in the eye region, the iris image capturing apparatus 100a may capture an eye movement stabilized image.

For example, the shape of the reflection region generated due to the contamination of a camera lens may be distinguished from the shape of the reflection region generated due to eyeglasses worn by the user.

For example, the guide information output for the shape of the reflection region generated due to a contamination of a camera lens is described in greater detail below with reference to FIG. 6.

The guide information output for the shape of the reflection region generated due to eyeglasses worn by the user is described in greater detail below with reference to FIGS. 8A to 8C.

The guide information may include at least one of visual information, auditory information, and vibration information. For example, the guide information output unit 60 may include an audio output unit that outputs audio signals, a display unit that outputs video signals, and/or a vibration motor that outputs vibration signals.

Figure 2:
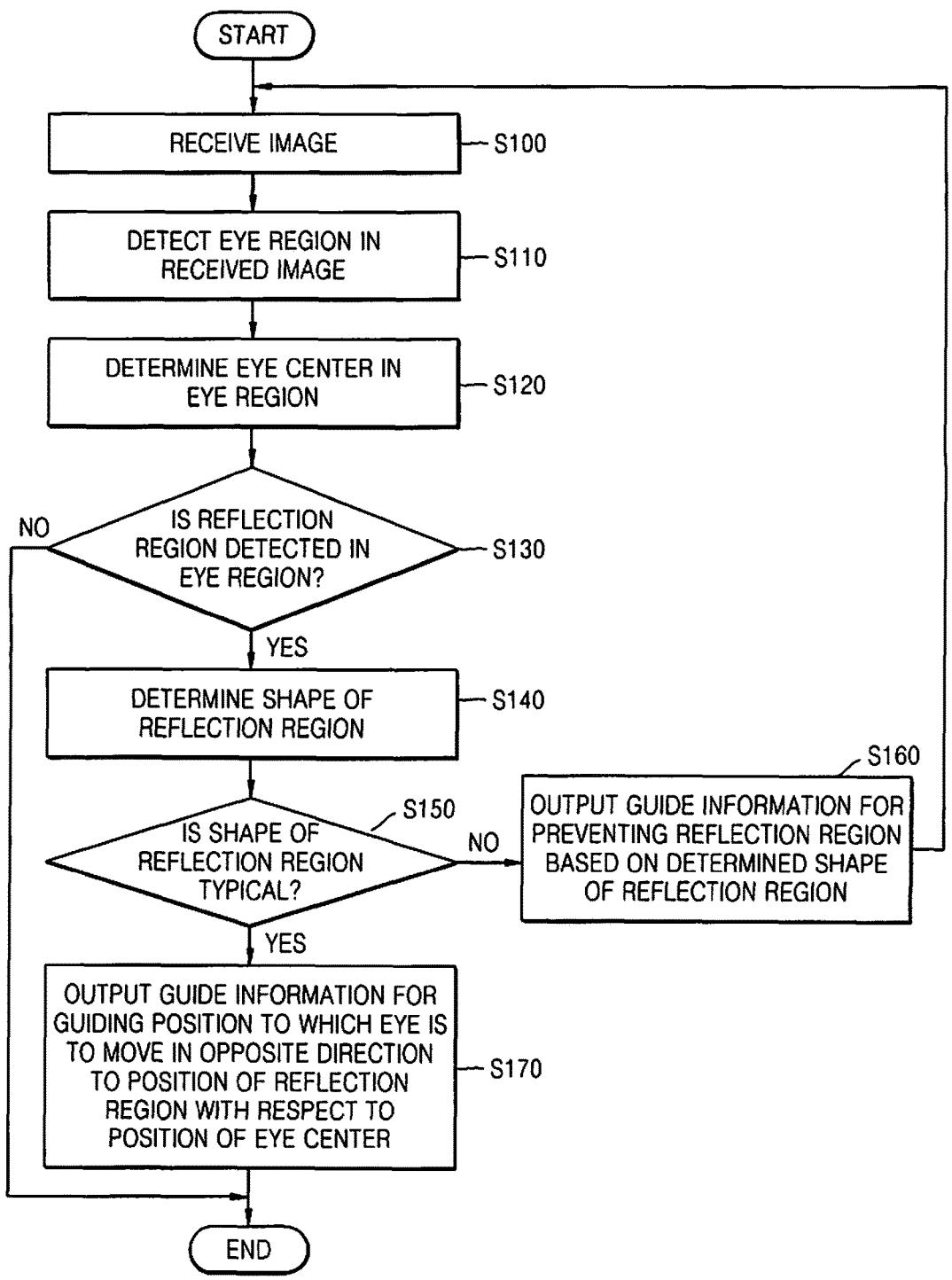
FIG. 2 is a flowchart illustrating an iris image capturing method for providing guide information, according to an embodiment of the present invention.

FIG. 2 is a flowchart of an iris image capturing method for providing guide information, according to an embodiment of the present invention.

Referring to FIG. 2, in step S100, the iris image capturing apparatus 100a receives an image.

For example, the image may be an image including an eye region acquired from a camera.

In step S110, the iris image capturing apparatus 100a detects an eye region in the received image.

A method of detecting an eye region from an input image may include various methods such as, for example, a learning-based method and a mask-based method, but is not limited thereto.

In step S120, the iris image capturing apparatus 100a determines an eye center in the detected eye region.

For example, the eye center may be a center point of the eye region.

As another example, the eye center may be center coordinates of a region of the eye region that has a pixel gray scale value that is less than or equal to a predetermined threshold value. Also, the eye center may be a center of a pupil region.

In step S130, the iris image capturing apparatus 100a determines whether a reflection region is detected in the detected eye region.

For example, the reflection region may be a region of the eye region that has a pixel gray scale value that is greater than or equal to a threshold value. The pixel gray scale value may be represented by numerical values 0 to 255 representative of pixel intensity.

The eye region refers to a region including a pupil, an iris, and a sclera.

When a reflection region is not detected, guide information for preventing a reflection is not output and the methodology terminates.

When a reflection region is detected, the iris image capturing apparatus 100a determines a shape of the reflection region, in step S140.

According to an embodiment of the present invention, a boundary line of adjacent pixels having a great change in the pixel gray scale value may be detected as the shape of the reflection region.

According to an embodiment of the present invention, the shape of the reflection region may be determined by the form, size, position, and number of the reflection region. For example, the shape of the reflection region generated due to eyeglasses worn by the user may be an elliptical or circular shape, as illustrated in FIGS. 7A and 7B. Also, the shape of the reflection region generated due to the contamination of a camera lens may be an atypical shape, as illustrated in FIGS. 5A and 5B.

In step S150, the iris image capturing apparatus 100a determines whether the shape of the reflection region is typical or atypical.

A typical shape of the reflection region includes an elliptical or a circular reflection region 120c independently present, as illustrated in FIG. 7A. A typical shape of the reflection region also includes an elliptical reflection region 120d and a circular reflection region 120c overlapping each other, as illustrated in FIG. 7B.

An atypical shape of the reflection region includes a linear reflection region 120a distributed across an eye region 110a around circular or elliptical reflection light, as illustrated in FIG. 5A. An atypical shape of the reflection region also includes an atypical (non-circular or non-elliptical) reflection region 120c that overlaps an eye region 110a, as illustrated in FIG. 5B.

The guide information for preventing the reflection region is output based on the shape of the reflection region. For example, the guide information may include at least one of visual information, auditory information, and vibration information.

If the shape of the reflection region is determined to be atypical, the iris image capturing apparatus 100a outputs guide information for removing a contaminant of a camera lens to the user, in step S160. The methodology then returns to step S100.

According to an embodiment of the present invention, when a portable terminal is used to provide an iris image capturing method, and a camera lens is stained with a fingerprint or a foreign substance due to the user's touch, a contaminant of the camera lens of the portable terminal may interfere with iris image capturing by the portable terminal. Due to a contaminant of a camera lens or an eyeglass lens, an atypical reflection region may be detected in the eye region.

In order to capture an iris image by using an image from which a reflection region is removed, the guide information, including at least one of visual information, auditory information, and vibration information, is output, as described in greater detail below with reference to FIG. 6.

If the shape of the reflection region is determined to be typical, the iris image capturing apparatus 100a outputs guide information for guiding a position to which an eye is to move, which is opposite to that of the reflection region with respect to an eye center, in step S170. The methodology then terminates after step S170.

If the shape of the reflection region is determined to be typical, the position of the eye center and the position of the reflection region may be acquired. The guide information for guiding the position to which the eye is to move is output.

The position of the eye center may vary depending on the eye region. For example, the position of the eye center may be a center of an iris or pupil region.

Also, the position of the reflection region may vary depending on at least one of the shape, number, and size of the reflection region. For example, when the shape of the reflection region is a circular or elliptical, a center of the circular or elliptical shape may be determined as the position of the reflection region. For example, when the shape of the reflection region is a plurality of circular or elliptical shapes, a center of the circular or elliptical shape having the largest area among the plurality of circular or elliptical shapes may be determined as the position of the reflection region.

When the reflection region includes overlapping circular and elliptical shapes, a halfway point between a center of the circular shape and a center of the elliptical shape may be determined as the position of the reflection region. However, a method of determining the position of the reflection region is not limited thereto.

The guide information may include at least one of visual information, auditory information, and vibration information. For example, a pointer User Interface (UI) screen, which provides information about the position to which the eye is to move, or an eye guide line UI screen may be displayed on a display unit of the portable terminal, which is described in greater detail below with reference to FIGS. 8A to 8C.

Figure 3:
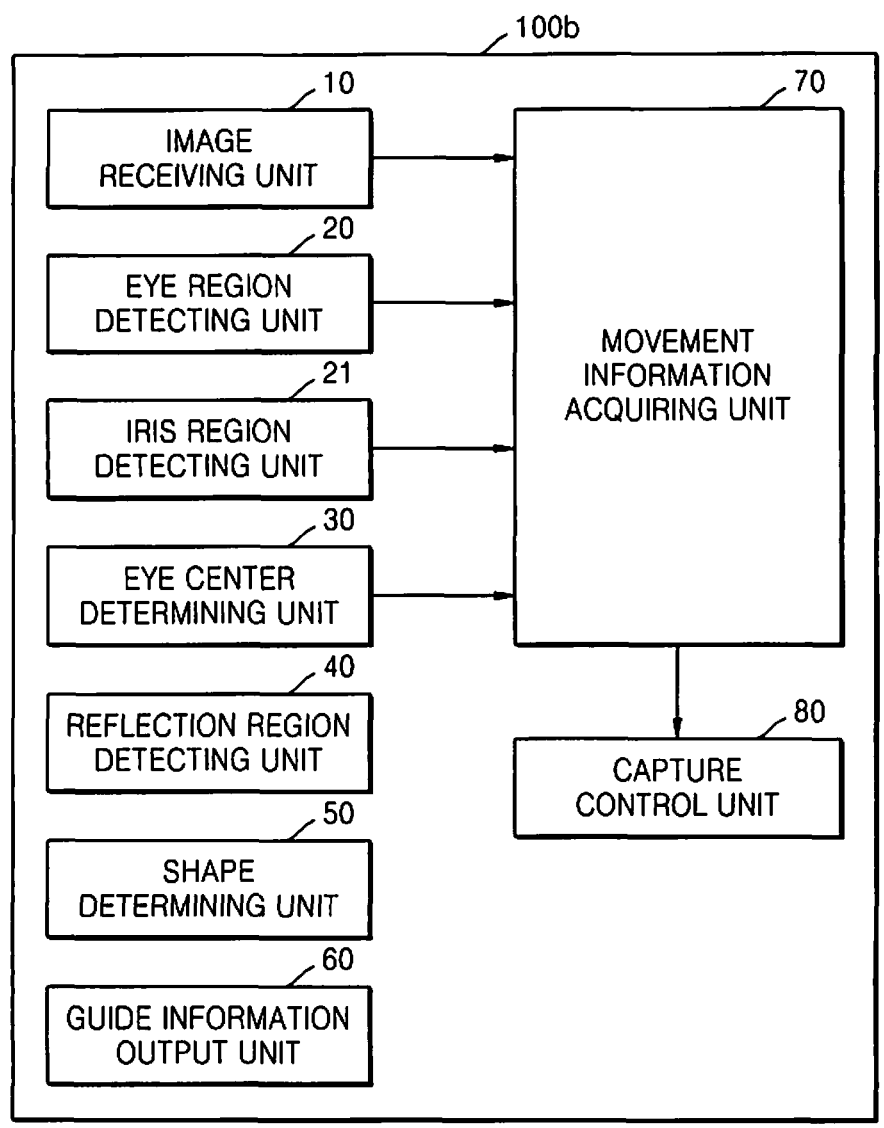
FIG. 3 is a block diagram illustrating an iris image capturing apparatus for capturing an eye movement stabilized image, according to an embodiment of the present invention.

FIG. 3 is a block diagram of an iris image capturing apparatus for capturing an eye movement stabilized image, according to an embodiment of the present invention.

Referring to FIG. 3, in addition to the components of the iris imaging capturing apparatus 100a of FIG. 1, the iris image capturing apparatus 100b further includes a movement information acquiring unit 70, a capture control unit 80, and an iris region detecting unit 21.

The iris region detecting unit 21 detects an iris region in the eye region detected by the eye region detecting unit 20.

The iris region is a region including an iris, and may be detected based on the eye region detected in an image acquired by a camera. According to an embodiment of the present invention, an iris diameter in the eye region may vary depending on the distance between the user and the camera. Accordingly, a different iris region may be detected when the iris diameter varies.

The iris region may be determined in the eye region detected in the image received from the camera, based on a predetermined iris diameter. For example, when the distance between the user and a camera lens capturing an image is about 15 cm, the iris diameter may have about 200 pixels, and when the distance between the user and the camera lens is about 25 cm, the iris diameter may have about 130 pixels.

According to an embodiment of the present invention, when a reflection region is not detected in the eye region detected by the eye region detecting unit 20, the movement information acquiring unit 70 acquires eye movement information by detecting eye movement. According to another embodiment of the present invention, the movement information acquiring unit 70 acquires iris movement information by detecting iris movement in the iris region detected by the iris region detecting unit 21.

According to an embodiment of the present invention, the eye movement detected in an iris image capturing method is used to determine whether a blur is generated by motion during image capturing.

For example, in an embodiment of the present invention, a variation degree value, such as, for example, a variance or a standard deviation, of eye center coordinates acquired from consecutive image frames of the image received by the image receiving unit may be acquired as the eye movement information. In another embodiment of the present invention, when a range of eye center coordinates acquired from consecutive image frames of the image received by the image receiving unit is determined in a region within a predetermined range (L<x<R, B<y<T), the number of consecutive image frames may be acquired as the eye movement information. Herein, in the predetermined range, L may be the smallest value of an x axis, R may be the greatest value of the x axis, B may be the smallest value of a y axis, and T may be the greatest value of the y axis. In this case, the values of L, R, B, and T may vary depending on resolution, the distance between the user and the camera, and/or the number of frames per second, but are not limited thereto. This embodiment is described in greater detail below with reference to FIGS. 9A and 9B.

According to an embodiment of the present invention, the capture control unit 80 may be configured to capture the image when the eye movement information acquired by the movement information acquiring unit 70 is less than or equal to a predetermined threshold value. According to another embodiment of the present invention, the capture control unit 80 may be configured to capture the image when the iris movement information acquired by the movement information acquiring unit 70 is less than or equal to a predetermined threshold value.

Figure 4:
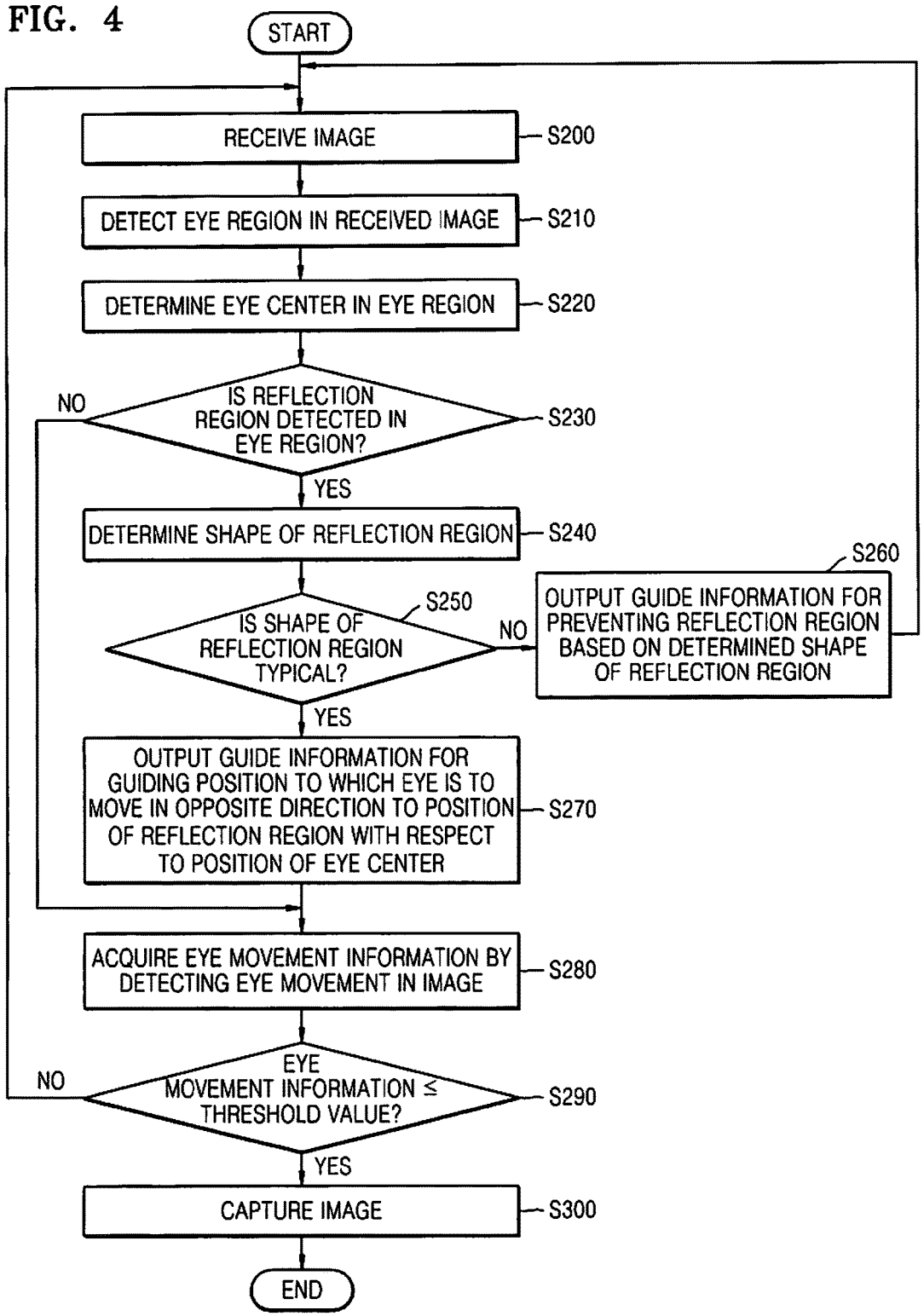
FIG. 4 is a flowchart illustrating an iris image capturing method for capturing an eye movement stabilized image, according to an embodiment of the present invention.

FIG. 4 is a flowchart of an iris image capturing method for capturing an eye movement stabilized image, according to an embodiment of the present invention.

Steps S200 to S270 of FIG. 4 are identical to steps S100 to S170 of FIG. 1.

Referring to FIG. 4, when a reflection region is not detected in the eye region in step S230, eye movement information is acquired by detecting eye movement in the eye region, in step S280.

When a reflection region is detected in the eye region and guide information for guiding a position to which the eye is to move is output, in step 270, and the user moves the eye according to the guide information, eye movement information is then acquired, in step S280.

According to an embodiment of the present invention, the eye movement may be a position change of the eye center in a plurality of image frames acquired from the camera. A plurality of image frames may be input from a moving image, and eye movement may be detected from input frames. According to another embodiment of the present invention, the eye movement may be a position change of the eye center in a plurality of still images acquired from the camera.

According to an embodiment of the present invention, a variation degree value, such as a variance or a standard deviation, of eye center coordinates acquired from consecutive image frames of the image received by the image receiving unit may be acquired as the eye movement information. Also, in another embodiment of the present invention, when a range of eye center coordinates acquired from consecutive image frames of the image received by the image receiving unit is determined in a region within a predetermined range (L<x<R, B<y<T), the number of consecutive image frames may be acquired as the eye movement information. In the predetermined range, L may be the smallest value of an x axis, R may be the greatest value of the x axis, B may be the smallest value of a y axis, and T may be the greatest value of the y axis. In this case, the values of L, R, B, and T may vary depending on resolution, the distance between the user and the camera, and/or the number of frames per second, but are not limited thereto.

In step S290, it is determined whether the eye movement information is less than or equal to a predetermined threshold value.

For example, the predetermined threshold value may include at least one of a variance value, a standard deviation value, and the number of frames.

If the eye movement information is less than or equal to the predetermined threshold value, the image is determined to be an eye movement stabilized image, and an image is captured, in step S300.

If the eye movement information is greater than the predetermined threshold value, the methodology returns to step S200. Thus, the eye movement information may be analyzed by receiving the image acquired from the camera until the eye movement stabilized image is received.

FIGS. 5A and 5B illustrate an atypical reflection region determined by the iris image capturing apparatus, according to an embodiment of the present invention.

According to an embodiment of the present invention, the iris image capturing apparatus 100a is included in a portable terminal 1000 (e.g., a portable phone, a digital camera, or a camcorder), which includes a camera 1100.

A linear reflection region 120a is distributed across an eye region 110a around circular or elliptical reflection light, as illustrated in FIG. 5A. Also, the atypical (non-circular or non-elliptical) reflection region 120b overlaps the eye region 110a, as illustrated in FIG. 5B.

Figure 6:
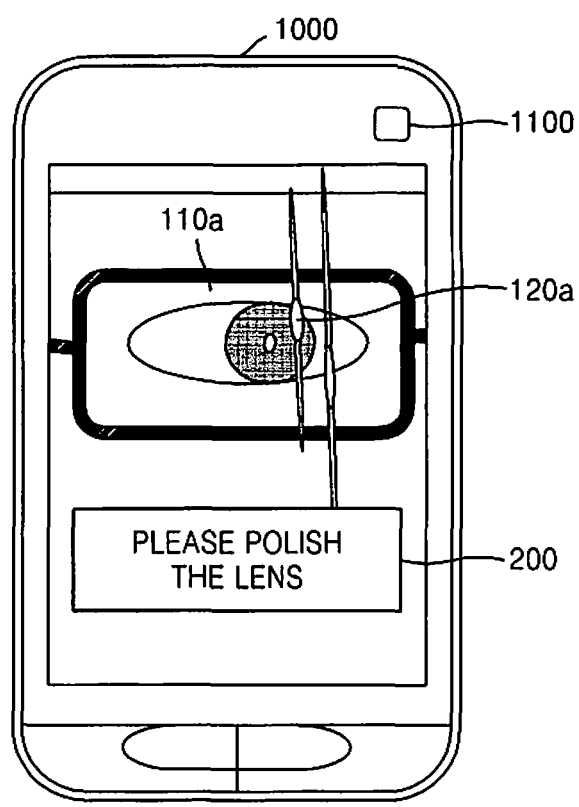
FIG. 6 illustrates the outputting, by the iris image capturing apparatus, of guide information for preventing a reflection region based on an atypical reflection region, according to an embodiment of the present invention.

FIG. 6 illustrates the outputting, by the iris image capturing apparatus, of guide information for preventing a reflection region based on an atypical reflection region, according to an embodiment of the present invention.

According to an embodiment of the present invention, when the reflection region 120a is detected in the eye region 110a, guide information 200 for guiding the user to remove a contaminant of a camera lens or an eyeglass lens (i.e., "please polish the lens") is displayed on a display unit of the portable terminal 1000.

FIGS. 7A and 7B illustrate a typical reflection region determined by the iris image capturing apparatus, according to an embodiment of the present invention.

An elliptical or a circular reflection region 120c is independently present, as illustrated in FIG. 7A. Also, an elliptical reflection region 120d and the circular reflection region 120c may overlap each other, as illustrated in FIG. 7B.

Figure 8C:
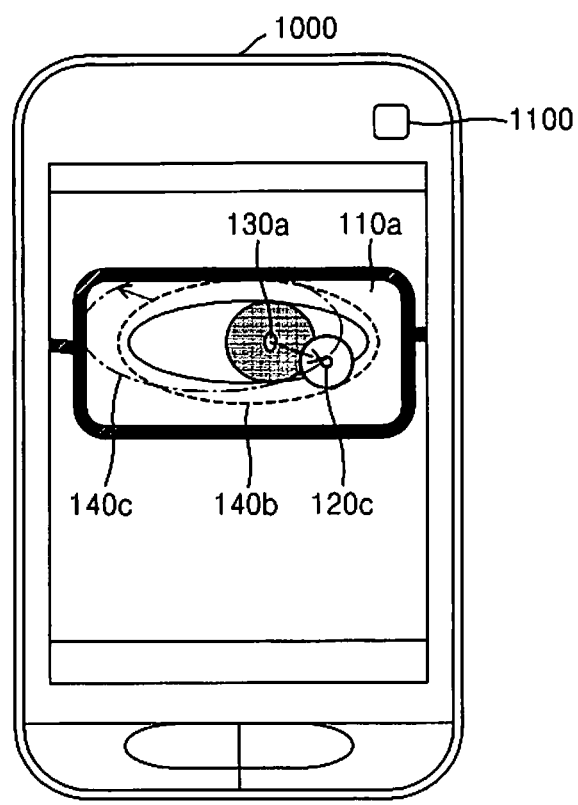

FIGS. 8A to 8C illustrate the outputting, by the iris image capturing apparatus, of guide information for preventing a reflection region based on a typical reflection region, according to an embodiment of the present invention.

When the typical reflection region 120c is detected in the eye region 110a, as illustrated in FIG. 8A, a position of the eye center and a position of the reflection region are acquired.

Guide information for guiding a position to which the eye is to move, which is opposite that of the reflection region with respect to the eye center, is output. For example, when the typical reflection region 120c is detected in the eye region 110a, as illustrated in FIG. 8B, a pointer UI screen 140a for guiding a position, to which the eye is to move, which is opposite that of the reflection region with respect to a position 130a of the eye center, is displayed on a display unit of the portable terminal 1000.

The pointer UI screen 140a, for guiding the position to which the eye is to move, is displayed on the display unit of the portable terminal 1000 at a distance away from the eye center 130*a* that is opposite to the distance from the typical reflection region 120*c* to the eye center 130*a*.

When the typical reflection region 120*c* is detected in the eye region 110*a* located in a guide line UI screen 140*b* of a first eye, as illustrated in FIG. 8C, the guide line UI screen 140*c* of a second eye, which is moved in a direction opposite to the position of the typical reflection region 120*c*, with respect to the position 130*a* of the eye center, is displayed on a display unit of the portable terminal 1000.

The guide line UI screen 140*c* of the second eye may be displayed on the display unit of the portable terminal 1000 at a distance away from a guide line UI screen 140*b* that is opposite to the distance from the eye center 130*a* to the typical reflection region 120*c*.

FIGS. 9A and 9B illustrate the acquiring, by the iris image capturing apparatus, of eye movement information by detecting eye movement in an eye region, according to an embodiment of the present invention.

The eye movement may be a position change of eye centers 130*b* and 130*c* in image frames 110*b* and 110*c* acquired from the camera 1100. In this case, a plurality of image frames may be input from a moving image, and iris movement may be detected from input frames. Also, according to another embodiment of the present invention, the eye movement may be a position change of eye centers 130*b* and 130*c* in a plurality of still images acquired from the camera 1100.

For example, in an embodiment of the present invention, a variation degree value, such as a variance or a standard deviation, of eye center coordinates acquired from consecutive image frames of the image received by the image receiving unit may be acquired as the eye movement information. Also, in another embodiment of the present invention, when a range of eye center coordinates acquired from consecutive image frames of the image received by the image receiving unit is determined in a region within a predetermined range ($L<x<R$, $B<y<T$), the number of consecutive image frames may be acquired as the eye movement information. In the predetermined range, L may be the smallest value of an x axis, R may be the greatest value of the x axis, B may be the smallest value of a y axis, and T may be the greatest value of the y axis. In this case, the values of L, R, B, and T may vary depending on resolution, the distance between the user and the camera, and/or the number of frames per second, but are not limited thereto.

While eye movement is detected by a position change of an eye center in two image frames, as illustrated in FIGS. 9A and 9B, the number of image frames is not limited thereto.

The apparatuses according to embodiments of the present invention may include a processor, a memory for storing and executing program data, a permanent storage such as a disk drive, and UI devices such as, for example, a touch panel, keys, and buttons.

Methods implemented by a software module or algorithm may be stored on a computer-readable recording medium as computer-readable codes or program commands that are executable on the processor. Examples of the computer-readable recording medium include magnetic storage media (e.g., Read-Only Memories (ROMs), Random-Access Memories (RAMs), floppy disks, and hard disks) and optical recording media (e.g., Compact Disk-ROMs (CD-ROMs) and Digital Versatile Disks (DVDs)). The computer-readable recording medium may also be distributed over network-coupled computer systems so that the computer-readable codes may be stored and executed in a distributed fashion. The computer-readable recording medium is readable by a computer, and may be executed in a processor.

For the purposes of promoting an understanding of the concept of the present invention, reference has been made to the embodiments illustrated in the drawings, and particular terms have been used to describe the embodiments of the present invention. However, the scope of the present invention is not limited by the particular terms, and the present invention may encompass all elements that may be generally conceived by those of ordinary skill in the art.

The embodiments of the present invention may be described in terms of functional block components and various processing operations. Such functional blocks may be implemented by any number of hardware and/or software components that execute particular functions. For example, the embodiments of the present invention may employ various Integrated Circuit (IC) components, such as, for example, memory elements, processing elements, logic elements, and lookup tables, which may execute various functions under the control of one or more microprocessors or other control devices. Similarly, where the elements of the present invention are implemented by software programming or software elements, the embodiments of the present invention may be implemented by any programming or scripting language such as, for example, C, C++, Java, or assembly language, with various algorithms being implemented by any combination of data structures, processes, routines, or other programming elements. Functional aspects may be implemented by an algorithm that is executed in one or more processors. Also, the embodiments of the present invention may employ the related art for electronic environment setting, signal processing, and/or data processing. Terms such as "mechanism", "element", "unit", and "configuration" may be used in a broad sense, and are not limited to mechanical and physical configurations. The terms may include the meaning of software routines in conjunction with processors or the like.

Particular implementations described herein are merely exemplary, and do not limit the scope of the present invention in any way. For the sake of conciseness, descriptions of related art electronic configurations, control systems, software, and other functional aspects of the systems may be omitted. Also, the connection lines or connection members illustrated in the drawings represent exemplary functional connections and/or physical or logical connections between the various elements, and various alternative or additional functional connections, physical connections, or logical connections may be present in a practical apparatus. Also, no element may be essential to the practice of the embodiments of the present invention unless the element is specifically described as "essential" or "critical".

Recitations of a range of values herein are merely intended to serve as a shorthand method of referring individually to each separate value falling within the range, unless otherwise indicated herein, and each separate value is incorporated into the specification as if it was individually recited herein. Also, the operations of the method described herein may be performed in any suitable order unless otherwise indicated herein or otherwise clearly contradicted by the context. The scope of the present invention is not limited to the above-described operation order. All examples or exemplary terms (e.g., "such as") provided herein are merely used to describe the embodiments of the present invention in detail, and the scope of the present invention is not limited by the examples or exemplary terms unless otherwise claimed. Also, those of ordinary skill in the art will readily understand that various modifications and combinations may be made according to design conditions and factors without departing from the spirit and scope of the present invention as defined by the following claims.

What is claimed is:

1. A method of capturing an image in a portable terminal, the method comprising the steps of:
receiving an image at the portable terminal;
detecting an eye region in the image;
determining an eye center of the eye region;
determining whether a reflection region is detected in the eye region; and
if the reflection region is detected:
determining a shape of the reflection region; and
outputting guide information for preventing the reflection region based on the shape of the reflection region.

2. The method of claim 1, wherein the guide information comprises at least one of visual information, auditory information, and vibration information.

3. The method of claim 1, wherein the guide information comprises information for removing a contaminant of a camera lens or an eyeglass lens, if the shape of the reflection region is determined to be atypical.

4. The method of claim 1, wherein the guide information comprises information for guiding an eye in the image to move in a direction that is opposite that of the reflection region, with respect to the eye center, if the shape of the reflection region is determined to be typical.

5. The method of claim 1, further comprising, if the reflection region is not detected:
acquiring eye movement information by detecting eye movement; and
capturing the image if the eye movement information is less than or equal to a predetermined threshold value.

6. The method of claim 5, wherein the eye movement information is a variation degree value, including a variance or a standard deviation, of eye center coordinates respectively acquired from consecutive image frames of the image.

7. The method of claim 5, wherein:
detecting the eye region comprises detecting an iris region in the eye region,
the eye center is an iris center of the iris region, and
the eye movement information is movement information of the iris center of the iris region.

8. An image capturing apparatus comprising:
a camera configured to receive an image;
at least one processor configured to:
detect an eye region in the image,
determine an eye center of the eye region,
determine whether a reflection region is detected in the eye region, and
determine a shape of the reflection region, if the reflection region is detected; and
display configured to output guide information for preventing the reflection region based on the shape of the reflection region, if the reflection region is detected.

9. The image capturing apparatus of claim 8, wherein the guide information comprises at least one of visual information, auditory information, and vibration information.

10. The image capturing apparatus of claim 8, wherein the guide information comprises information for removing a contaminant of a camera lens or an eyeglass lens, if the shape determining unit determines that the shape of the reflection region is atypical.

11. The image capturing apparatus of claim 8, wherein the guide information comprises information for guiding an eye in the image to move in a direction that is opposite that of the reflection region, with respect to the eye center, if the shape determining unit determines that the shape of the reflection region is typical.

12. The image capturing apparatus of claim 8, wherein the at least one processor is further configured to:
acquire eye movement information by detecting eye movement if the reflection region is not detected; and
capture the image if the eye movement information is less than or equal to a predetermined threshold value.

13. The image capturing apparatus of claim 12, wherein the eye movement information is a variation degree value, including a variance or a standard deviation, of eye center coordinates acquired from consecutive image frames of the image received by the image receiving unit.

14. The image capturing apparatus of claim 12, wherein the at least one processor is further configured to detect an iris region in the eye region,
wherein the eye center is an iris center of the iris region, and
the eye movement information is movement information of the iris center of the iris region.

15. A non-transitory computer-readable recording medium that stores computer program codes for performing a guide information providing method for an image capturing method when executed by a processor, the image capturing method comprising:
receiving an image;
detecting an eye region in the image;
determining an eye center of the eye region;
determining whether a reflection region is detected in the eye region; and
if the reflection region is detected:
determining a shape of the reflection region; and
outputting guide information for preventing the reflection region based on the shape of the reflection region.

16. The non-transitory computer-readable recording medium of claim 15, wherein, if the reflection region is not detected, the image capturing method further comprises:
acquiring eye movement information by detecting eye movement; and
capturing the image if the eye movement information is less than or equal to a predetermined threshold value.

* * * * *